United States Patent
Koide et al.

(10) Patent No.: US 6,673,411 B2
(45) Date of Patent: Jan. 6, 2004

(54) OPTICAL RECORDING MEDIUM

(75) Inventors: Akihiro Koide, Chiba (JP); Yuji Inatomi, Chiba (JP); Tadashi Koike, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/168,621

(22) PCT Filed: Oct. 22, 2001

(86) PCT No.: PCT/JP01/09248

§ 371 (c)(1), (2), (4) Date: Jun. 24, 2002

(87) PCT Pub. No.: WO02/37486

PCT Pub. Date: May 10, 2002

(65) Prior Publication Data

US 2003/0021942 A1 Jan. 30, 2003

(30) Foreign Application Priority Data

Oct. 23, 2000 (JP) ........................................ 2000-322874

(51) Int. Cl.$^7$ ................................................. B32B 3/02
(52) U.S. Cl. ................ 428/64.1; 428/64.8; 430/270.14; 369/275.4
(58) Field of Search .............................. 428/64.1, 64.4, 428/64.8, 913; 430/270.14, 270.16, 495.1, 945; 369/275.4

(56) References Cited

U.S. PATENT DOCUMENTS

| 5,144,552 | A | * | 9/1992 | Abe | 369/275.4 |
| 6,054,199 | A | * | 4/2000 | Sugiyama | 428/64.1 |
| 6,452,899 | B1 | * | 9/2002 | Fujii | 369/275.4 |
| 6,576,321 | B2 | * | 6/2003 | Mihara | 428/64.1 |

FOREIGN PATENT DOCUMENTS

| JP | 62-24453 A | 2/1987 |
| JP | 5-67355 A | 3/1993 |
| JP | 2000-48406 A | 2/2000 |

* cited by examiner

Primary Examiner—Elizabeth Mulvaney
(74) Attorney, Agent, or Firm—Burns, Doane, Swecker & Mathis, LLP

(57) ABSTRACT

A recordable optical recording medium comprising a recording layer containing an organic dye which can absorb a laser beam and a metal reflective layer directly or via another layer on a transparent supporting substrate having a pre-groove and a pre-pit, wherein the organic dye has a refractive index nk of 2.2 or more at a reproduction wavelength $\lambda_2$; in relation to the reproduction wavelength $\lambda_2$, the depths of the pre-groove and the pre-pit on the substrates are more than $\lambda_2/4$; and the following equations are satisfied:

$$0.25r \leq wg \leq 0.38r;$$

$$0.25 \leq wp/wg \leq 0.75;$$

$$\theta gr \leq \theta pr; \text{ and}$$

$$\theta pr \leq \theta pt$$

wherein r is a recording laser beam diameter represented by $\lambda_1/NA$ where $\lambda_1$ is a recording wavelength [μm] and NA is a numerical aperture for an object lens; wg [μm] and θgr are a half value width and a cross-section tilting angle in a substrate radial direction for the pre-groove, respectively; and wp [μm], θpr and θpt are a half value width, a cross-section tilting angle in a substrate radial direction and a cross-section tilting angle in a tangential direction for the pre-pit, respectively.

14 Claims, 1 Drawing Sheet

RADIAL SECTION

TANGENTIAL SECTION

RADIAL SECTION (a)          (b)

TANGENTIAL SECTION (c)

OPTICAL RECORDING MEDIUM

TECHNICAL FIELD

This invention relates to an optical recording medium on which information can be recorded and/or reproduced using a laser beam. In particular, it relates to a hybrid type high-density optical recording medium which is a recordable recording medium allowing recording with a higher density than a CD and comprises a pre-pit and a pre-groove on a substrate.

BACKGROUND ART

Among disk media for optical recording, a recordable compact disk on which recording can be performed only once, and has been popularly used because of its compatibility with a common read-only CD-ROM. For a digital versatile disk (DVD) with a higher recording density than a CD, recordable media have been developed, among which a recordable DVDR is expected to become popular because of its higher compatibility with a DVD-ROM. These recordable media use an organic dye in a recording layer, in which a dye irradiated with a laser beam is locally heated to undergo chemical and/or physical change such as decomposition, deformation, vaporization, melting and solidification to form a pit, allowing information to be recorded.

Meanwhile, there has been proposed an optical recording medium combining a read-only region such as the above CD-ROM and DVD-ROM (ROM region) and a recording region or recordable region such as the above CDR and DVDR (R region) in a single disk. Such specifications will become very important. Such a disk is referred to as a "hybrid disk", characterized in that on a substrate, a pre-pit and a pre-groove are formed in a ROM and a R regions, respectively.

Recently, in consumer applications, there has been steady shift from a CD to DVD. In the process, there has been emphasized importance of copyright protection for music, image and moving picture software. Thus, it has become inevitable to thoroughly prevent copying particularly for a DVDR medium permitting recording with the same format. It has been, therefore, standardized to incorporate control data for copy prevention as an ROM region in a data control region on a disk in advance. Specifically, all DVDRs sold in a customer market must be supplied as a hybrid type. There have been needs to propose a convenient and stable hybrid type DVDR as soon as possible.

Although a hybrid disk using an organic dye as a recording film has been standardized for CDR, providing a signal amplitude (recording modulation factor) is more difficult in an ROM region than an R region and therefore, satisfactory properties have not been achieved. It is because a recording layer comprising a dye is formed not only on a pre-groove in the R region but also on a pre-pit in the ROM region so that the same pre-pit shape as that in a commercially available CD does not give an adequate modulation factor.

JP-As 4-146537 and 9-120586 have disclosed that depths of a pre-pit and pre-groove can be adjusted to control a difference in optical path lengths and thus to achieve good signal balance. This technique may, however, have drawbacks that it generally requires difficult stamper cutting of two beams in production, and that a recording signal may be degraded because a relatively shallower groove has a V shape.

There has been proposed an approach that a deposition position of a recording layer is controlled such that the recording layer is formed only over an R region while directly forming a reflective layer over an ROM region. Boundary control is, however, difficult from an R region to an ROM region or an ROM region to an R region. In particular, it cannot be a practical solution in the light of compatibility in reproduction with a CD or DVD player.

A temporary approach has been adopted in most cases, where a pre-pit is formed by in advance conducting recording by a writer in a predetermined region in a recordable disk having only a usual R region for distributing a small number of products. Such an approach cannot be, of course, applied to a mass production.

It is thus desirable for an ROM region in a hybrid disk that the pre-pit information is formed from a stamper template by an appropriate technique such as injection molding.

DISCLOSURE OF INVENTION

An objective of this invention is to provide a hybrid disk type of optical recording medium in which a recording layer comprising at least a dye and a reflective layer are sequentially formed on a substrate including an ROM region having a pre-pit and an R region having a pre-groove, exhibiting good recording/reproduction properties meeting DVD specifications in both ROM and R regions.

We have intensely attempted to solve the above problems and have finally found that in a DVDR medium requiring forming a high-density recording pit with a smaller size than a beam spot, the pre-pit and the pre-groove may have the same depth if their depths are more than $\lambda_2/4$ and that controlling half value widths of the pre-pit and the pre-groove and providing a tilting angle, in particular a tilting angle in a tangential direction in the pre-pit, allow a signal to be satisfactorily provided from the ROM region. We have also found that a refractive index of a dye material used in a recording film can be adjusted to give more favorable properties, resulting in this invention.

Specifically, this invention provides 1. a recordable optical recording medium comprising a recording layer containing an organic dye which can absorb a laser beam and a metal reflective layer directly or via another layer on a transparent supporting substrate having a pre-groove and a pre-pit, wherein the organic dye has a refractive index nk of 2.2 or more at a reproduction wavelength $\lambda_2$; in relation to the reproduction wavelength $\lambda_2$, the depths of the pre-groove and the pre-pit on the substrates are more than $\lambda_2/4$; and the following equations are satisfied:

$0.25r \leq wg \leq 0.38r$;

$0.25 \leq wp/wg \leq 0.75$;

$\theta gr \leq \theta pr$; and $\theta pr \leq \theta pt$ wherein r is a recording laser beam diameter represented by $\lambda_1$/NA where $\lambda_1$ is a recording wavelength [μm] and NA is a numerical aperture for an object lens; wg [μm] and θgr are a half value width and a cross-section tilting angle in a substrate radial direction for the pre-groove, respectively; and wp [μm], θpr and θpt are a half value width, a cross-section tilting angle in a substrate radial direction and a cross-section tilting angle in a tangential direction for the pre-pit, respectively;

2. The recordable optical recording medium as described in paragraph 1 wherein the pre-groove and the pre-pit formed on the substrate further satisfy the relationship of θgr <θpt;

3. The recordable optical recording medium as described in paragraph 1 or 2 wherein the pre-groove and the pre-pit have the same depth;

4. The recordable optical recording medium as described in any of paragraphs 1 to 3 wherein the recording layer containing the organic dye is formed on the pre-pit and the pre-groove with a film thickness in the range of 50 nm to 150 nm;

5. The optical recording medium as described in any of paragraphs 1 to 4 wherein the dye contained in the recording layer is an organic dye comprising at least one pyrrole unit or a metal complex thereof;

6. The optical recording medium as described in paragraph 5 wherein the dye contained in the recording layer is a pyrromethene-metal complex represented by formula (1):

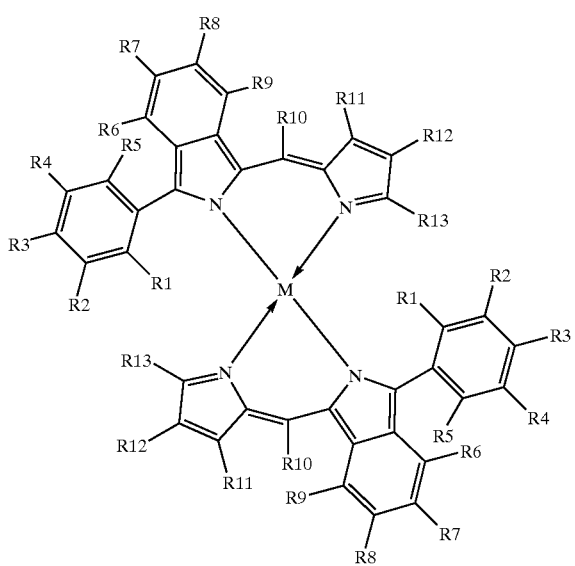

(1)

wherein R1 to R13 independently represent hydrogen, halogen, substituted or unsubstituted $C_1$–$C_{12}$ alkyl, substituted or unsubstituted $C_1$–$C_{12}$ alkoxy, and substituted or unsubstituted $C_6$–$C_{20}$ aryl; and M is a central metal;

7. The optical recording medium as described in any of paragraphs 1 to 6 wherein $\lambda_1$ is 0.63 μm to 0.66 μm and NA is 0.60±0.1;

8. The optical recording medium as described in any of paragraphs 1 to 7 having a structure where on a transparent substrate, a recording layer, a reflective layer, an adhesion layer directly or via another layer and another substrate are laminated.

DESCRIPTION OF THE SYMBOLS

1: a substrate;
2: a pre-groove;
3: a pre-pit;
d: a depth;
wg: a half value width of the pre-groove;
θgr: a cross-sectional tilting angle of the pre-groove in a radial direction;
wp: a half value width of the pre-pit;
θpr: a cross-sectional tilting angle of the pre-pit in a radial direction;
θpt: a cross-sectional tilting angle of the pre-pit in a tangential direction.

BEST MODE FOR CARRYING OUT THE INVENTION

An optical recording medium according to this invention has a structure where a dye-containing recording layer, a reflective layer and a protective layer are sequentially formed on a substrate having an ROM region consisting of a pre-pit and an R region consisting of a pre-groove, which has the same depth as that of the pre-pit, and further has a structure where a dummy substrate is laminated on the protective layer via an adhesive. The pre-pit in the ROM region and the pre-groove in the R region have particular shapes.

Figure 1:
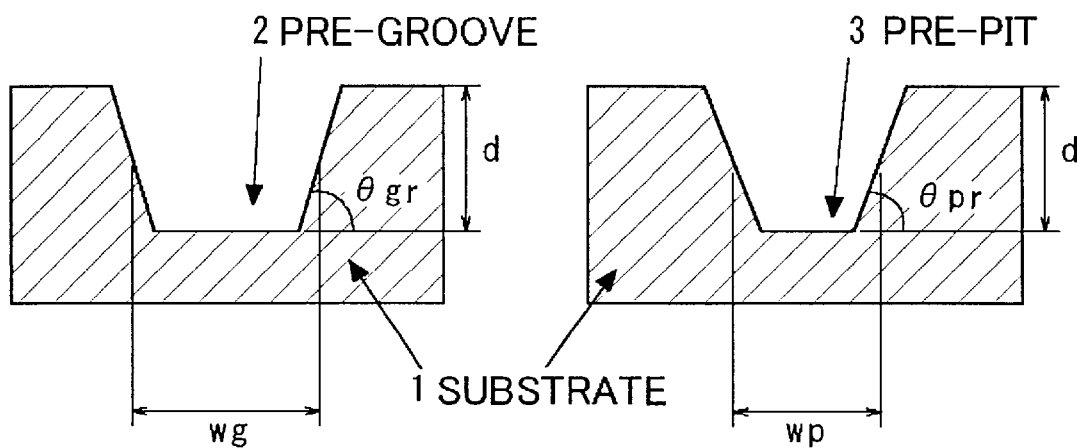
FIG. 1(a) shows a cross section of a pre-groove in an R region in a radial direction.
FIG. 1(b) shows a cross section of a pre-pit in an ROM region in a radial direction.
FIG. 1(c) schematically shows a cross section of the pre-pit in a tangential direction.
Figure 1:
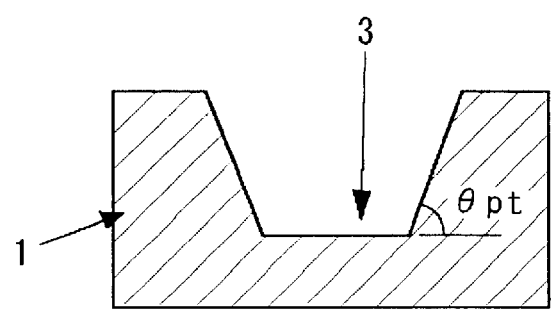

The shapes of a pre-pit in the ROM region and a pre-groove in the R region will be described with reference to FIG. 1.

Preferably, both pre-groove 2 in the R region and pre-pit 3 in the ROM region formed in a substrate 1 have a depth (d) in the range of $\lambda_2/4$ to $\lambda_2/3$ both inclusive where $\lambda_2$ is a reproduction wavelength. For example, when a reproduction wavelength for a DVDR is 650 nm, these may be desirably formed with a depth in the range of 162.5 to 216.7 nm both inclusive. If the depth is lower then the range, providing a pre-pit signal amplitude in the ROM region becomes difficult regardless of their shapes. On the other hand, if the depth is larger than the range, substrate molding become quite difficult and thus it is impractical.

A half value width wg of the pre-groove 2 (a pre-groove width at the ½ depth of the pre-groove) in the R region shown in FIG. 1(a) can be optimized in the wg/r range of 0.25 to 0.38 where r is a beam spot size defined as $\lambda_1$/NA, depending on the type of the dye contained in the recording layer and a deposition process. For example, when a reproduction wavelength $\lambda_1$ in a DVDR is 650 nm (0.65 μm) and a numerical aperture NA of an object lens is 0.65, a beam spot size r is about 1 μm and therefore, a half value width of the pre-groove 2 is in the range of 0.25 to 0.38 μm. Control of a dependent shape on the pre-groove, i.e., a shape of a reflective layer interface (depth and width) is similarly important. When the pre-groove half value width is less than 0.25, signal leakage (crosstalk) through a land tends to be increased, leading to signal degradation (e.g., a jitter value). If it is more than 0.38, it may undesirably cause substantial degradation in transferability during molding a substrate.

A pre-pit half value width wp (a pre-pit width at the ½ depth of the pre-pit) in the ROM region shown in FIG. 1(b) may be selected such that in relation to the pre-groove, wp/wg becomes relatively narrower in the range of 0.25 to 0.75 to particularly provide a signal modulation factor with a finer pit, which can be easily balanced with a signal in the R region. If it is less than 0.25, it may cause extreme reduction in a tracking output in the ROM region. If it is larger than 0.75, an insufficient signal modulation factor may be achieved in the ROM region. With reference to the pre-groove half value width wg as described above, a pre-pit half value width is in the range of 0.0625 to 0.285 μm, but it may be appropriately selected such that the above depth is consistent with the below tilting angle.

In this invention, the cross section of the pre-pit is also defined. In particular, in terms of a pit cross-section tilting angle in a radial direction θpr and a pit cross-section tilting angle in a track tangent line direction (tangential direction) θpt (FIG. 1(c)), a substrate in which θpr is different from a pre-groove titling angle θgr is prepared for adjusting balance between the R region and a signal amplitude, so that a modulation factor may be easily provided when θpr≧θgr. Furthermore, in terms of a tilting angle in a tangential direction in the pre-pit, signal quality may be improved in the ROM region. In addition, the pre-pit may have the same depth as that of the pre-groove.

A cross-section tilting angle θgr of the pre-groove 2 is preferably 45 to 65°, more preferably 55 to 65°. A cross-section tilting angle θpr in a substrate radial direction of the pre-pit 3 is preferably 55 to 75°, more preferably 65 to 75° while the above relationship θgr≦θpr is satisfied. A cross-section tilting angle θpt in a tangential direction of the pre-pit 3 is preferably 60 to 80°, more preferably 65 to 80° while the above relationship θpr≦θpt is satisfied.

The shapes of the pre-groove and the pre-pit (width, depth and angle) can be controlled by a shape and an irradiation intensity of an irradiated laser cutting beam during exposure to a beam with a large laser power covering the entire photoresist film in its thickness direction in preparing a stamper template. The angle and the width may be adjusted to some extent by molding conditions.

The pre-groove and the pre-pit may be wobbled with individually optimized amplitude. In addition, a land pre-pit for address information may be separately formed between wobbled pre-grooves (land).

The shapes of the pre-groove and the pre-pit may be determined by STM, AFM or SEM observation of a frozen broken-out section.

In this invention, a substrate may be made of a material which is transparent at a recording/reproduction wavelength λ₂ and exhibits a smaller optical anisotropy. Examples of a material which can be used include polymers such as polycarbonates, polyacrylates, polymethacrylates, polyolefins and epoxy resins; and inorganic materials such as glasses. Polycarbonate resins are preferable because they exhibit good balance between optical transparency and heat resistance and have good moldability. Polyolefins having a ring structure are similarly desirable because of their smaller optical anisotropy and lower hygroscopicity.

A preferable recording layer used in this invention has a refractive index nk of 2.2 or more at a reproduction wavelength λ₂ and has a film thickness of 50 nm to 150 nm over the pre-pit or pre-groove for obtaining an adequate reproduction output from the ROM region while maintaining good recording properties in the R region. A refractive index less than 2.2 tends not to give a signal amplitude in the ROM region.

A film thickness of the recording layer beyond the above range led to significant deterioration in recording quality.

Specific examples of a dye used herein include macrocyclic aza-annulene dyes such as phthalocyanine dyes, naphthalocyanine dyes and azaporphyrin dyes with 1 to 4 mesonitrogens; porphyrin dyes; azo dyes; indoaniline dyes; azulenium dyes; pyrromethene dyes; and polymethine dyes such as cyanine dyes, melocyanine dyes and squalirium dyes. Among these, preferable dyes exhibiting good durability and good recording properties in high-density recording were metal complex dyes comprising at least one pyrrole unit. Pyrromethene-metal complex dyes represented by chemical formula (1) are particularly preferable as dyes with a higher refractive index:

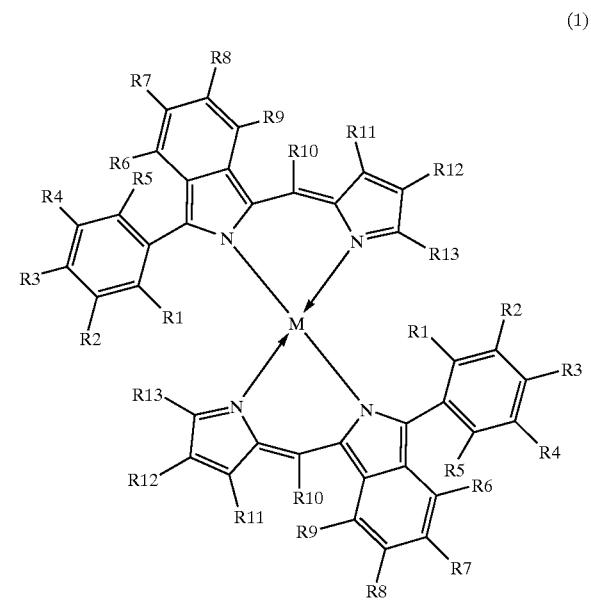

(1)

wherein R1 to R13 independently represent hydrogen, halogen, substituted or unsubstituted $C_1$–$C_{12}$ alkyl, substituted or unsubstituted $C_1$–$C_{12}$ alkoxy, and substituted or unsubstituted $C_6$–$C_{20}$ aryl; and M is a central metal.

Examples of a halogen atom in R1 to R13 include fluorine, chlorine, bromine and iodine atoms. Examples of substituted or unsubstituted alkyl include methyl, ethyl, n-propyl, isopropyl, n-butyl, isobutyl, sec-butyl, t-butyl, n-pentyl, isopentyl, 2-methylbutyl, 1-methylbutyl, neopentyl, 1,2-dimethylpropyl, 1,1-dimethylpropyl, cyclopentyl, n-hexyl, 4-methylpentyl, 3-methylpentyl, 2-methylpentyl, 1-methylpentyl, 3,3-dimethylbutyl, 2,3-dimethylbutyl, 1,3-dimethylbutyl, 2,2-dimethylbutyl, 1,2-dimethylbutyl, 1,1-dimethylbutyl, 2-ethylbutyl, 1-ethylbutyl, 1,2,2-trimethylbutyl, 1,1,2-trimethylbutyl, 1-ethyl-2-methylpropyl, cyclohexyl, n-heptyl, 2-methylhexyl, 3-methylhexyl, 4-methylhexyl, 5-methylhexyl, 2,4-dimethylpentyl, n-octyl, 2-ethylhexyl, 2,5-dimethylhexyl, 2,5,5-trimethylpentyl, 2,4-dimethylhexyl, 2,2,4-trimethylpentyl, 3,5,5-trimethylhexyl, n-nonyl, n-decyl, 4-ethyloctyl, 4-ethyl-4,5-dimethylhexyl, n-undecyl, n-dodecyl, methyl-2,4-dimethylheptyl, 2,2,5,5-tetramethylhexyl, 1-cyclopentyl-2,2-dimethylpropyl and 1-cyclohexyl-2,2-dimethylpropyl. Examples of substituted or unsubstituted $C_6$ to $C_{20}$ aryl include phenyl, nitrophenyl, cyanophenyl, hydroxyphenyl, methylphenyl, dimethylphenyl, trimethylphenyl, ethylphenyl, diethylphenyl, triethylphenyl, n-propylphenyl, di(n-propyl)phenyl, tri(n-propyl)phenyl, isopropylphenyl, di(isopropyl)phenyl, tri(isopropyl)phenyl, n-butylphenyl, di(n-butyl)phenyl, tri(n-butyl)phenyl, isobutylphenyl, di(isobutyl)phenyl, tri(isobutyl)phenyl, sec-butylphenyl, di(sec-butyl)phenyl, tri(sec-butyl)phenyl, t-butylphenyl, di(t-butyl)phenyl, tri(t-butyl)phenyl, dimethyl-t-butylphenyl, fluorophenyl, chlorophenyl, bromophenyl, iodophenyl, methoxyphenyl, ethoxyphenyl, trifluoromethylphenyl, N,N-dimethylaminophenyl, naphthyl, nitronaphthyl, cyanonaphthyl, hydroxynaphthyl, methylnaphthyl, fluoronaphthyl, chloronaphthyl, bromonaphthyl, iodonaphthyl, methoxynaphthyl, trifluoromethylnaphthyl and N,N-dimethylaminonaphthyl.

Any metal capable of forming a complex with a dipyrromethene compound can be used as a central metal M without limitations, but the central metal is preferably selected from transition metals such as Ni, Co, Cu, Mn, Zn and Pd in the light of stability and optical properties.

Of course, the above dyes can be combined for improving recording properties and/or durability, and can be also combined with one or more dyes other than those described above. The recording layer may be composed of a single layer or two or more layers.

The recording layer containing the above dye may be deposited by an appropriate application method such as spin coating, spray coating and roll coating. For application, a solution of the dye in a solvent, which does not affect any damage to a substrate, is prepared, and the solution is applied and then dried. A solvent is appropriately selected from the group consisting of aliphatic or alicyclic hydrocarbons such as hexane, heptane, octane and methylcyclohexane; aromatic hydrocarbons such as toluene and xylenes; ethers such as dibutyl ether and isopropyl ether; alcohols such as ethanol, tetrafluoropropanol and methyl cellosolve; and halogenated solvents such as chloroform and dichloromethane. These solvents may be used alone or in combination of two or more.

When two or more recording layers are laminated, it is preferable to select a solvent which gives no damage to a previously-formed layer, e.g., a solvent having different polarity for application of the upper recording layer.

The recording layer may be formed by vacuum deposition. This method is effective when the substances to constitute the recording layer have low solubility in solvents or when it is impossible to select a solvent which gives no damage to the substrate used. It is generally preferable because it can be controlled to give an even film thickness.

On the recording layer, there is formed a reflective layer made of a metal such as Au, Ag, Pt and Cu or an alloy thereof. Au is particularly preferable because of its stability to oxygen and moisture. The reflective layer may be deposited by an appropriate method such as vapor deposition, sputtering and ion plating. The reflective layer has a film thickness of 10 nm to 200 nm, preferably 50 nm to 150 nm. An intermediate layer may be formed between the metal reflective layer and the recording layer for improving interlayer adhesion and a reflectance.

On the reflective layer, a protective layer may be formed, which may be made of a polymer such as those polymerized by a general radical reaction (e.g., acrylates and methacrylates) and those polymerized by photo-induced cation polymerization such as epoxy polymers. These resins may be homopolymerized or copolymerized with other monomers and/or oligomers. UV curable resins are desirable. The protective layers may be formed by an appropriate method such as spin coating, screen-printing and bar coating. In the light of practical work, spin coating is often used. These films may have a thickness of 1 $\mu$m to 100 $\mu$m, desirably 1 to 20 $\mu$m.

This invention will be described with reference to, but not limited to, Examples.

EXAMPLES 1 TO 8 AND COMPARATIVE EXAMPLES 1 TO 8

A 20 g/L solution of one of pyrromethene dyes represented by formulas (A) to (C) in ethylcyclohexane was spin-coated on an injection-molded polycarbonate substrate with a thickness of 0.6 mm and a diameter of 120 mm$\phi$ having a spiral groove with a pitch of 0.74 $\mu$m and a pre-pit in a part of a lead-in region on the extension lines of the pre-groove to form a dye layer. On the dye layer was deposited by sputtering an Au reflective layer to 100 nm. Then, on the product was applied a UV curable resin SD-17 (Dainippon Ink And Chemicals, Inc.) and it was cured by UV. On the resin layer was laminated a polycarbonate substrate with a thickness of 0.6 mm as described above via Z8412 (JSR) radical adhesive, to prepare an optical recording medium.

The optical recording medium was evaluated for a signal modulation factor (I14/I14H) according to DVD specifications for a pre-pit using a disk tester "DDU-1000" (Pulstec Industrial Co., Ltd.) at wavelength: 658 nm and NA: 0.60, and for a modulation factor (I14/I14H) and a jitter in a recording region (clock to pit jitter) during recording an EFM signal on the pre-groove.

Table 1 shows the dyes, the pre-pit and the pre-groove shapes in the substrate tested in Examples and Comparative Examples and the signal evaluation results, where the pre-groove and the pre-pit shapes in the substrate were determined on the basis of AFM and SEM (cross section) observation data.

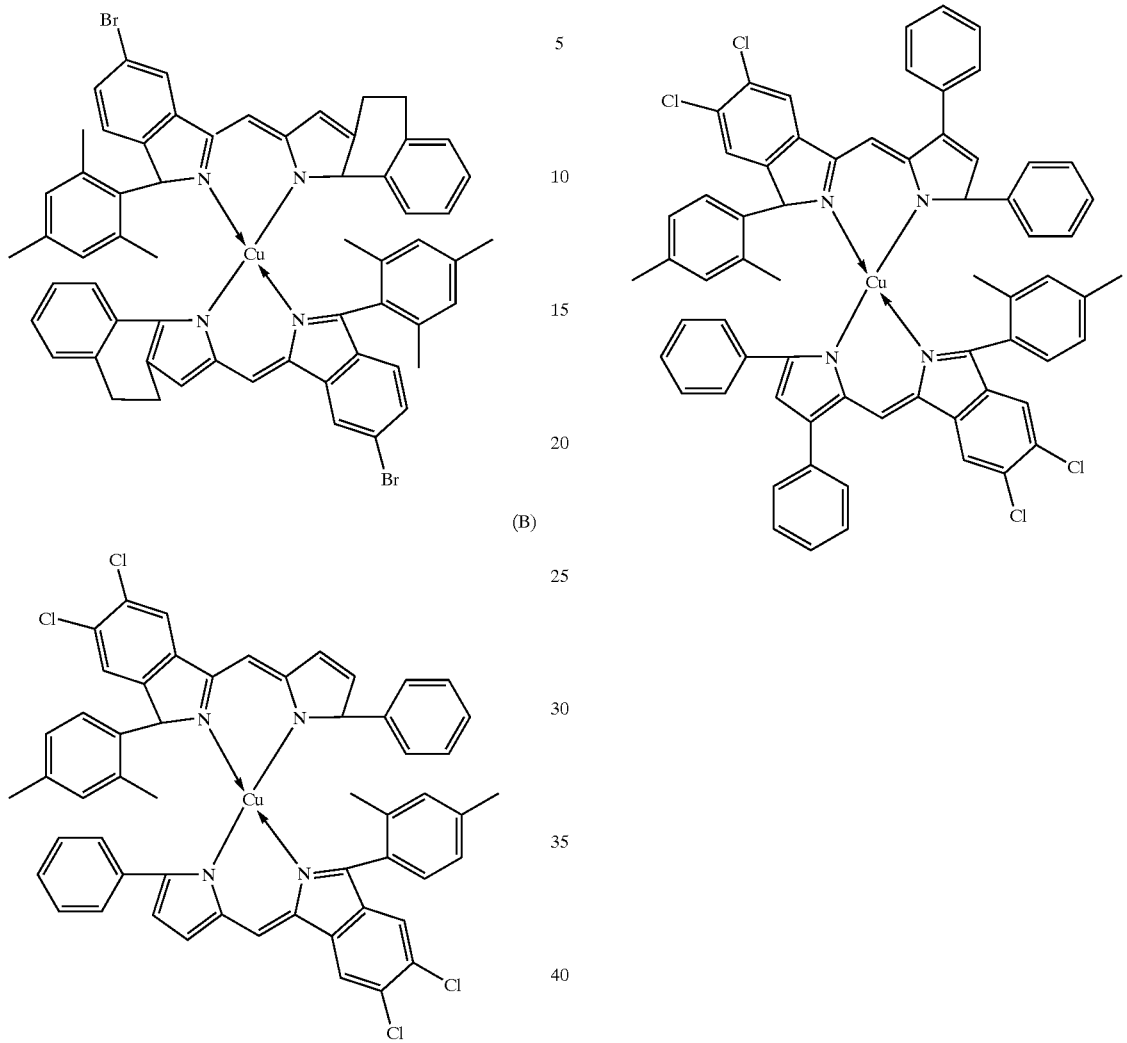
TABLE 1
| | Dye film | | | Substrate shape | | | | | | | | Signal properties | | |
| --- | --- | --- | --- | --- | --- | --- | --- | --- | --- | --- | --- | --- | --- | --- |
| | | Ref. Index | Thickness | d | wg | wp | | | θgr | θpr | θpt | R region | | ROM region |
| | Dye | (%) | (nm) | (nm) | (μm) | (μm) | wg/r | wp/wg | (°) | (°) | (°) | jitter | Modul. factor | Modul. factor |
| Ex. 1 | A | 2.62 | 100 | 175 | 0.35 | 0.20 | 0.32 | 0.57 | 60 | 70 | 72 | 7.5% | 0.68 | 0.65 |
| Ex. 2 | A | 2.62 | 100 | 175 | 0.35 | 0.25 | 0.32 | 0.71 | 60 | 70 | 72 | 7.5% | 0.68 | 0.60 |
| Ex. 3 | A | 2.62 | 100 | 175 | 0.35 | 0.25 | 0.32 | 0.71 | 55 | 68 | 68 | 7.9% | 0.66 | 0.60 |
| Ex. 4 | A | 2.62 | 100 | 175 | 0.38 | 0.15 | 0.35 | 0.39 | 60 | 70 | 72 | 7.4% | 0.65 | 0.72 |
| Ex. 5 | A | 2.62 | 60 | 175 | 0.38 | 0.15 | 0.35 | 0.39 | 60 | 70 | 72 | 8.5% | 0.60 | 0.72 |
| Ex. 6 | A | 2.62 | 140 | 190 | 0.38 | 0.15 | 0.35 | 0.39 | 60 | 66 | 65 | 7.9% | 0.75 | 0.65 |
| Ex. 7 | A | 2.62 | 110 | 190 | 0.30 | 0.20 | 0.28 | 0.67 | 61 | 65 | 68 | 8.5% | 0.68 | 0.66 |
| Ex. 8 | B | 2.22 | 110 | 190 | 0.30 | 0.20 | 0.28 | 0.67 | 61 | 65 | 68 | 7.9% | 0.65 | 0.61 |
| Comp. 1 | A | 2.62 | 100 | 175 | 0.35 | 0.27 | 0.32 | 0.77 | 55 | 68 | 68 | 7.9% | 0.66 | 0.55 |
| Comp. 2 | A | 2.62 | 100 | 175 | 0.25 | 0.20 | 0.23 | 0.80 | 61 | 65 | 68 | 10.1% | 0.66 | 0.68 |
| Comp. 3 | A | 2.62 | 100 | 175 | 0.35 | 0.20 | 0.32 | 0.57 | 60 | 50 | 50 | 7.5% | 0.68 | 0.55 |
| Comp. 4 | A | 2.62 | 100 | 175 | 0.35 | 0.20 | 0.32 | 0.57 | 60 | 60 | 45 | 7.5% | 0.68 | 0.50 |
| Comp. 5 | A | 2.62 | 120 | 150 | 0.30 | 0.20 | 0.28 | 0.67 | 55 | 60 | 60 | 9.5% | 0.61 | 0.55 |
| Comp. 6 | C | 2.15 | 100 | 175 | 0.38 | 0.15 | 0.35 | 0.39 | 60 | 70 | 72 | 8.1% | 0.60 | 0.55 |
| Comp. 7 | C | 2.15 | 100 | 190 | 0.30 | 0.20 | 0.28 | 0.67 | 61 | 65 | 68 | 8.9% | 0.59 | 0.53 |
| Comp. 8 | A | 2.62 | 100 | 175 | 0.44 | 0.20 | 0.41 | 0.45 | 61 | 65 | 68 | Tracking failure | | 0.68 |

INDUSTRIAL APPLICABILITY

According to this invention, by defining the shapes of a pre-groove in an R region and a pre-pit in an ROM region as disclosed herein, a pre-pit and pre-groove in an optical recording medium in which both R and ROM regions satisfy the DVD specifications and which exhibits good recording/reproduction properties can be formed in one step from a stamper template by, for example, injection molding, allowing mass production of such media.

What is claimed is:

1. A recordable optical recording medium comprising a recording layer containing an organic dye which can absorb a laser beam and a metal reflective layer directly or via another layer on a transparent supporting substrate having a pre-groove and a pre-pit, wherein the organic dye has a refractive index nk of 2.2 or more at a reproduction wavelength $\lambda_2$; in relation to the reproduction wavelength $\lambda_2$, the depths of the pre-groove and the pre-pit on the substrates are more than $\lambda_2/4$; and the following equations are satisfied:

$$0.25r \leq wg \leq 0.38r;$$

$$0.25 \leq wp/wg \leq 0.75;$$

$$\theta gr \leq \theta pr; \text{ and}$$

$$\theta pr \leq \theta pt$$

wherein r is a recording laser beam diameter represented by $\lambda_1/NA$ where $\lambda_1$ is a recording wavelength [μm] and NA is a numerical aperture for an object lens; wg [μm] and θgr are a half value width and a cross-section tilting angle in a substrate radial direction for the pre-groove, respectively; and wp [μm], θpr and θpt are a half value width, a cross-section tilting angle in a substrate radial direction and a cross-section tilting angle in a tangential direction for the pre-pit, respectively.

2. The recordable optical recording medium as claimed in claim 1 wherein the pre-groove and the pre-pit formed on the substrate further satisfy the relationship of θgr<θpt.

3. The recordable optical recording medium as claimed in claim 2 wherein the pre-groove and the pre-pit have the same depth.

4. The recordable optical recording medium as claimed in claim 3 wherein the recording layer containing the organic dye is formed on the pre-pit and the pre-groove a film thickness in the range of 50 nm to 150 nm.

5. The recordable optical recording medium as claimed in claim 4 wherein the dye contained in the recording layer is an organic dye comprising at least one pyrrole unit or a metal complex thereof.

6. The recordable optical recording medium as claimed in claim 5 wherein the dye contained in the recording layer is a pyrromethene-metal complex represented by formula (1):

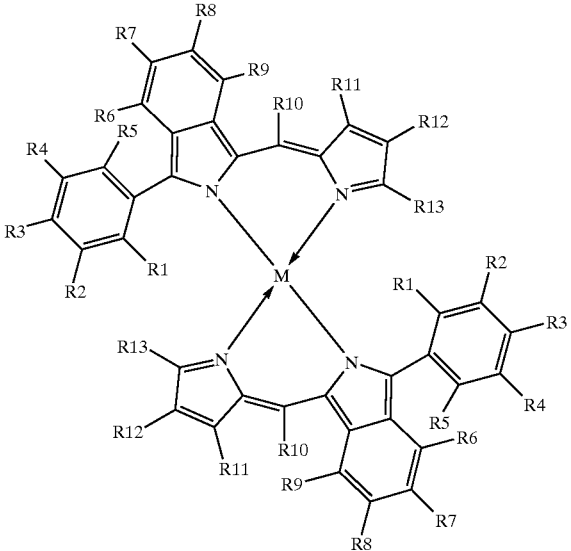

(1)

wherein R1 to R13 independently represent hydrogen, halogen, substituted or unsubstituted $C_1$–$C_{12}$ alkyl, substituted or unsubstituted $C_1$–$C_{12}$ alkoxy, and substituted or unsubstituted $C_6$–$C_{20}$ aryl; and M is a central metal.

7. The recordable optical recording medium as claimed in claim 6 wherein $\lambda_1$ is 0.63 μm to 0.66μm and NA is 0.60±0.1.

8. The recordable optical recording medium as claimed in claim 7 having a structure where on a transparent substrate, a recording layer, a reflective layer, an adhesion layer directly or via another layer and another substrate are laminated.

9. The recordable optical recording medium as claimed in claim 1 wherein the pre-groove and the pre-pit have the same depth.

10. The recordable optical recording medium as claimed in claim 1 wherein the recording layer containing the organic dye is formed on the pre-pit and the pre-groove a film thickness in the range of 50 nm to 150 nm.

11. The recordable optical recording medium as claimed in claim 1 wherein the dye contained in the recording layer is an organic dye comprising at least one pyrrole unit or a metal complex thereof.

12. The recordable optical recording medium as claimed in claim 11 wherein the dye contained in the recording layer is a pyrromethene-metal complex represented by formula (1):

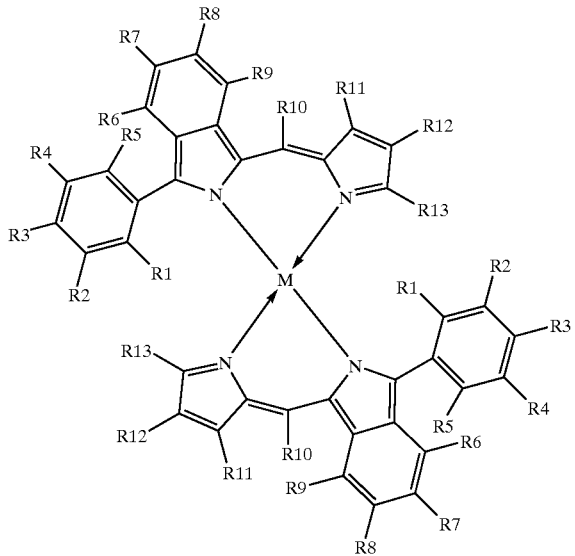

(1)

wherein R1 to R13 independently represent hydrogen, halogen, substituted or unsubstituted $C_1$–$C_{12}$alkyl, substituted or unsubstituted $C_1$–$C_{12}$alkoxy, and substituted or unsubstituted $C_6$–$C_{20}$aryl; and M is a central metal.

13. The recordable optical recording medium as claimed in claim 1 wherein $\lambda_1$ is 0.63 μm to 0.66 μm and NA is 0.60±0.1.

14. The recordable optical recording medium as claimed in claim 1 having a structure where on a transparent substrate, a recording layer, a reflective layer, an adhesion layer directly or via another layer and another substrate are laminated.

* * * * *